United States Patent [19]

O'Quin

[11] Patent Number: 4,944,284
[45] Date of Patent: Jul. 31, 1990

[54] PORTABLE STOVE

[76] Inventor: Vorney O'Quin, P.O. Box 215, Galliano, La. 70354

[21] Appl. No.: 402,773

[22] Filed: Sep. 5, 1989

[51] Int. Cl.[5] .............................................. F23C 11/00
[52] U.S. Cl. .............................. 126/41 R; 126/39 R; 126/41 B
[58] Field of Search ................... 126/41 R, 41 B, 39 R

[56] References Cited

U.S. PATENT DOCUMENTS

| | | | |
|---|---|---|---|
| 1,012,054 | 12/1911 | Berry | 126/41 R |
| 1,038,849 | 9/1912 | Carter | 126/41 R |
| 1,085,671 | 2/1914 | Day | 126/41 R |
| 3,696,803 | 10/1972 | Holloway | 126/41 R |
| 4,334,462 | 6/1982 | Hefling | 126/41 R |
| 4,421,016 | 12/1983 | Sich | 126/41 R |
| 4,677,964 | 7/1987 | Lohmeyer et al. | 126/41 R |
| 4,773,319 | 9/1988 | Holland | 126/41 R |

Primary Examiner—Carroll B. Dority
Attorney, Agent, or Firm—Thomas S. Keaty

[57] ABSTRACT

The invention relates to a portable stove and provides for the use of a horizontal platform on which a vertically oriented cylindrical housing is positioned. A plurality of burners are secured adjacent a lower portion of the housing, the burners being connected through a fuel transmitting conduit to a fuel source outside of the housing. A pair of support plates are secured within the housing above the burners with one of the plates being connected to a bar which rotates the plate, to a limited degree, about its central axis in a horizontal plane, so as to cover notches formed in the second plate by its solid surface. The second plate is also provided with a plurality of equidistantly spaced notches, which, when aligned with notches of the first plate, allow heat to directly escape through the notches to an upper portion of the housing. The stove can be used for boiling, frying and/or grilling, when desired. An electrical motor mounted on the platform transmits rotation through a gear reduction assembly to a shaft which is removably positioned on the top edge of the housing for dry roasting of food.

19 Claims, 5 Drawing Sheets

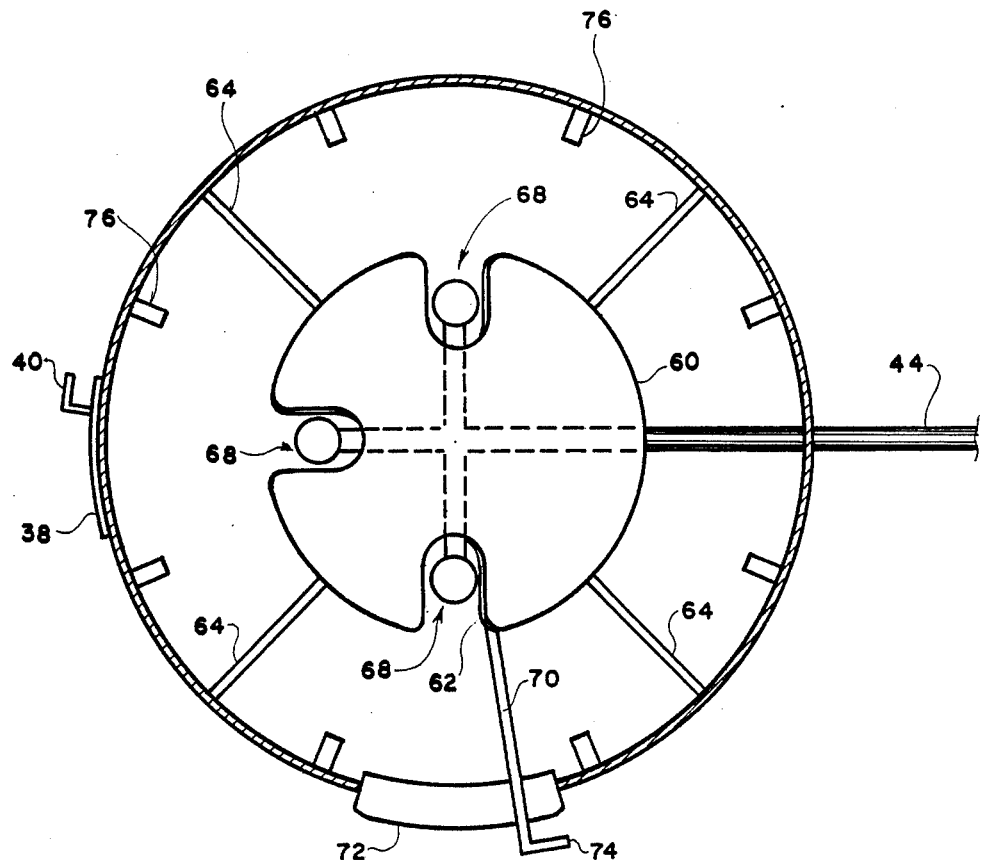
F I G. 2

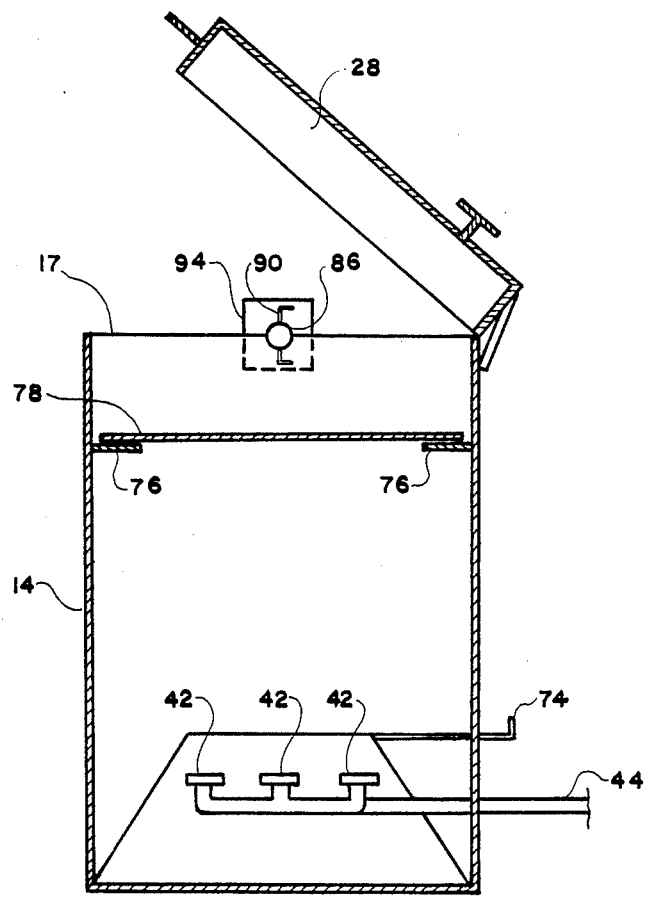
F I G. 3

4,944,284

PORTABLE STOVE

BACKGROUND OF THE INVENTION

The present invention relates to outdoor cooking, and more specifically to outdoor stoves which can be transported to a predetermined location and set up as a portable unit.

Numerous devices have been utilized to allow cooking out of doors, such as barbecue units, portable grills, etc. Some of these units are designed to be heated by charcoal, while other units are adapted for use with a portable gas tank which connects to the heating conduits, supplying the necessary heat for cooking.

The gas heated units are often mounted on a supporting frame, which also forms a support for a portable gas tank which supplies the fuel to the heating elements. The cooking unit itself is supported on the top portion of the frame and adapted for positioning food to be cooked therein.

In the majority of cases, the walls of the cooking unit are low, while the food supporting plates or grills are mounted adjacent the top of the cooking unit. As a result, there is an ever present problem of grease and food particles splattering over the edges of the cooking unit and presenting not only cleaning problems, but also hazardous conditions, when hot grease escapes the cooking unit. Some of the units are formed with covers to prevent escape of grease and other undesirable particles from the cooking unit. However, in many cases, the cover is left open to allow observation and manipulation of the food being cooked in the cooking unit.

The present invention contemplates elimination of the drawbacks associated with the prior art.

SUMMARY OF THE INVENTION

The present invention provides a portable stove which comprises a platform and a cooking unit which is vertically oriented in relation to the horizontal platform. The cooking unit is formed with a substantially cylindrical housing having an open bottom through which heating elements supplying gas to the cooking unit extend. A dripping pan for collection of debris is mounted underneath the bottom of the housing in removable relationship therewith. The platform supports a vertically standing frame member with a handle to facilitate movement of the portable stove with the help of wheels which are mounted on opposite sides of the platform. A pair of lateral supporting plates are mounted within the housing above the heating elements, with the plates having a plurality of equidistantly spaced notches. One of the plates is laterally rotational, to a limited degree, so as, when rotated to a certain degree, cover the notches formed in the second plate and present a solid circular surface on which a cooking utensil, such as a pot, can be positioned. A handle extending from the outside of the housing and fixedly attached to the rotatable plate allows manipulation of the plate from the outside of the housing. A plurality of supporting pegs extend from a side wall of the housing into the interior of the housing above the circular supporting plates. The pegs allow positioning of a grill plate thereon adjacent a top portion of the housing.

A detachable shaft for supporting rotisserie spikes is provided for mounting on the top of the housing. The shaft is connected to an electrical motor which is mounted on the outside of the housing, to supply rotational force to the shaft and allow cooking of the food secured on the rotisserie inside the housing.

A cover is pivotally connected at one point to the side wall of the housing, adjacent the top edge of the housing, the cover being movable between a first closed position, covering the top of the housing and an open position, allowing free access to the interior of the housing. A ventilation opening is formed in the cover to allow escape of smoke, gasses and heat to the exterior of the housing when the cover is closed.

A trap door in the side wall of the housing at a level of the heating elements allows easy access to the heating elements and cleaning or adjustment thereof from the outside of the housing.

It is, therefore, an object of the present invention to provide a portable stove wherein the danger of grease splattering is minimized.

It is a further object of the present invention to provide a portable stove which can be easily adjusted to various types of cooking, such as food boiling, frying, grilling and the like.

It is a further object of the present invention to provide a portable stove, having supporting plates allowing even heat distribution within the housing.

These and other objects of the present invention will be more apparent to those skilled in the art from the following description of the invention.

BRIEF DESCRIPTION OF THE DRAWINGS

Reference will now be made to the drawings, wherein like parts are designated by like numerals, and wherein

FIG. 2 is a top view of the housing of the apparatus of the present invention.

FIG. 3 is a side view illustrating rotisserie shaft connected to the electrical motor.

DETAILED DESCRIPTION OF THE PREFERRED EMBODIMENT

Figure 1:
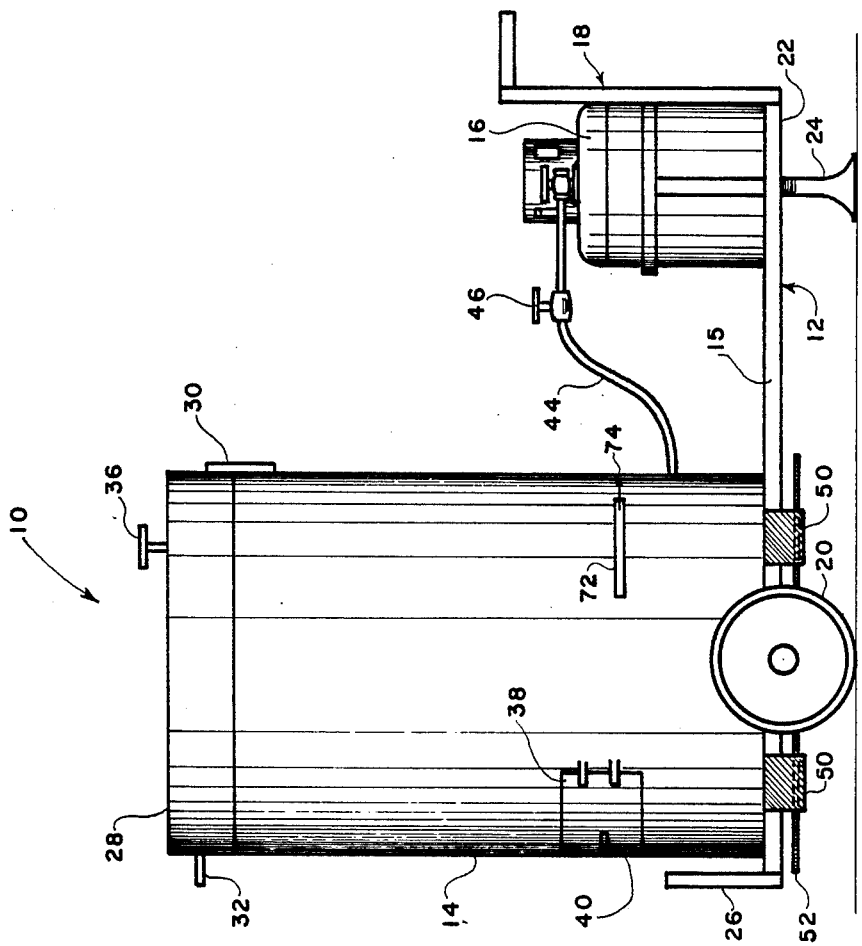
FIG. 1 is a perspective view of the apparatus in accordance with the present invention.
Figure 4:
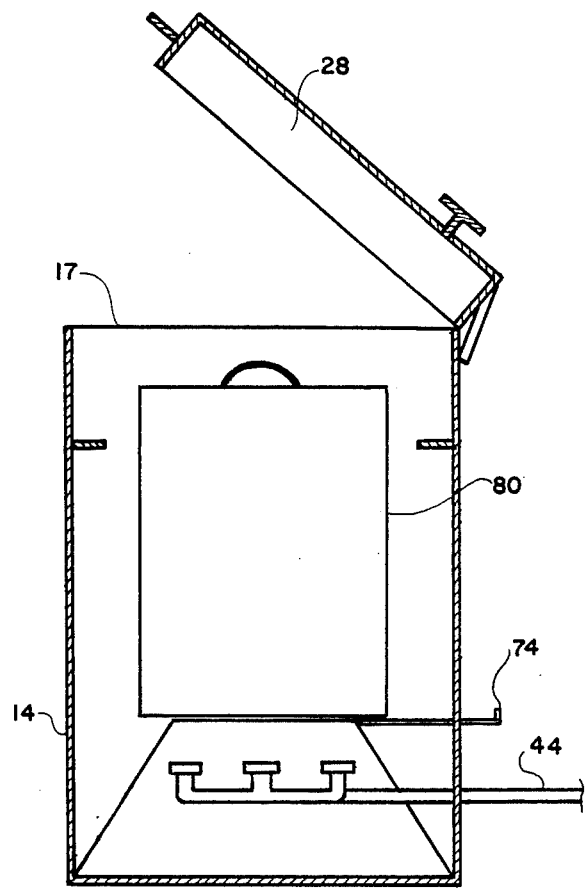
FIG. 4 is a side, partially cut-away view of the housing of the present invention illustrating position of a boiling pot within the housing.
Figure 5:
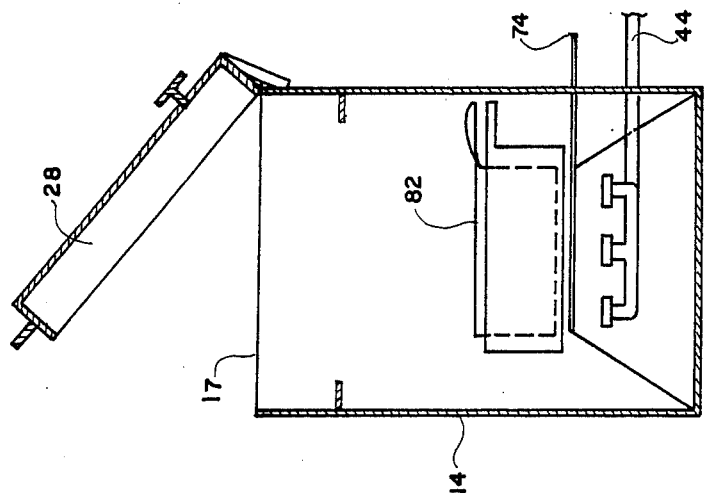
FIG. 5 is a side, partially cut-away view illustrating positioning of a frying pan within the housing.
Figure 6:
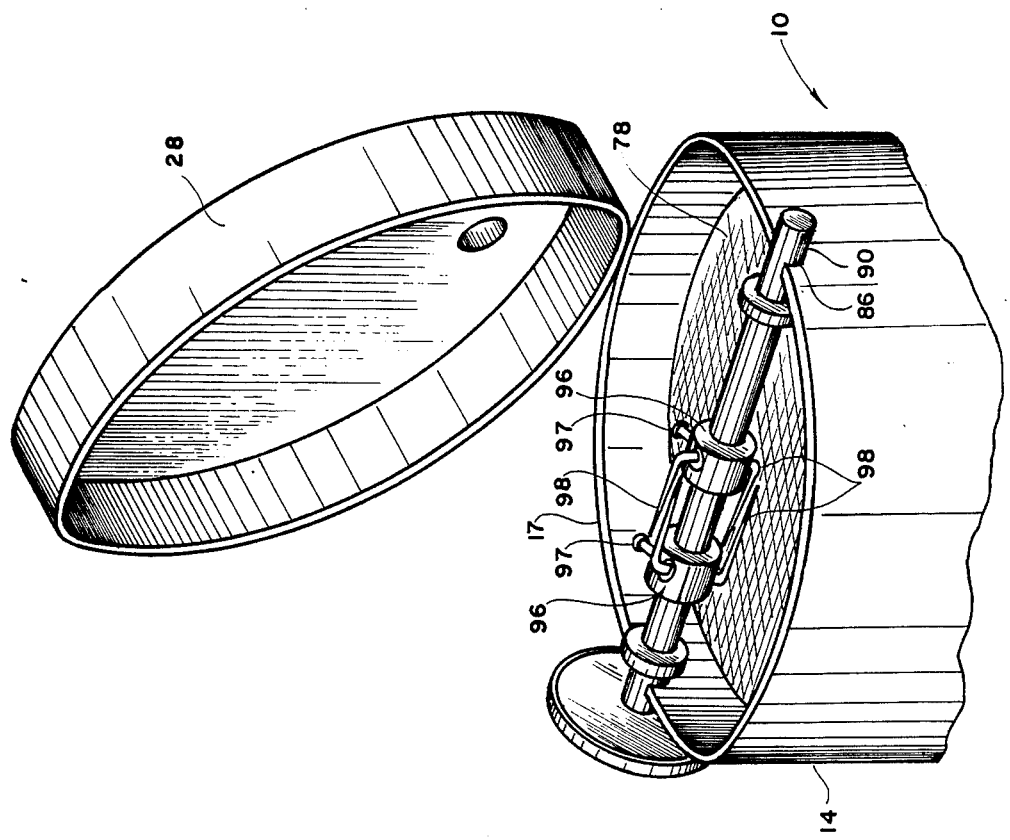
FIG. 6 is a perspective view illustrating positioning of a rotisserie shaft on the edge of the housing.

Referring now to the drawings in more detail, the apparatus of the present invention is generally designated by numeral 10. The portable stove 10 comprises a platform 12, a housing 14 mounted on the platform 12 and vertically oriented, while being supported adjacent one lateral end of the platform 12. The platform further extends to support a fuel supply tank 16 and a vertically oriented handle means 18. Adjacent the end of the platform wherein the housing 10 is positioned, a pair of wheels 20 allow movement of the portable stove to a predetermined location. By grasping the handle 18 and lifting the end 22 of the platform 12, the operator can easily roll the platform, with the housing position thereon, to the desired position.

When stationary, the platform 12 rests on the wheels 20 and a pair of supporting legs 24 which extend a distance downwardly from the platform 12 to a level of substantially similar plane with the wheels 20. As a result, when stationary, the platform 12 is oriented horizontally. A vertically extending frame member 26 which is attached to the horizontal portion 15 of the platform 12 supports and secures the housing 14, when the platform 12 is lifted upwardly by the handle 18, during transportation or should the housing 14 need to be cleaned inside and then emptied by tilting it forward, while resting on the frame member 26.

The housing 14 is formed as a substantially cylindrical tank having an open bottom and open top, the latter being selectively covered by a cover means 28 which is pivotally attached, such as at pivot point 30 to cover the top of the housing 14. A handle 32 on the diametrically opposite side from the pivot point 30 allows lifting of the cover 28 and pivoting it to an open position, allowing access to interior of the housing 14. An opening 34 is formed in the cover 14 to allow escape of smoke, gas, etc. to the exterior of the housing through a ventilation pipe 36.

A trap door 38 is pivotally attached to a side wall of the housing 14, the trap door being provided with a handle 40 allowing movement of the door to an open position to permit observation of the flame escaping from the heating elements inside the housing.

A plurality of heating elements 42 are positioned within the housing 14, with all of the heating elements being connected to a common fuel supply conduit 44, which is connected to a fuel supply tank 16 mounted on the platform 12 adjacent the housing. A gas regulating means 46 allows to regulate supply of gas delivered to the heating elements or burners 42. The gas supply tank 16 is a conventional tank containing butane or other gas suitable for use in outdoor cooking.

Mounted underneath the open bottom of the housing 14 is a debris collecting pan 50 which can be circular in shape and which is supported below the platform 12 by suitable frame bars 52. The pan 50 is designed to collect grease, food particles, etc. escaping from a cooking utensil during a cooking process, so as to prevent any danger of particles igniting grass in the area wherein the portable stove 10 is positioned. The pan 50 is easily removed from its position underneath the housing 14 for cleaning, when required, by simply sliding it away along the frame bars 52 and cleaning it in the conventional manner.

Mounted within the housing 14 above the burners 42 are a pair of heat distribution plates 60 and 62 which are supported above the burners 42 by suitable support bars 64. The plates 60 and 62 are vertically spaced apart and are co-aligned in parallel relationship, with the upper plate 62 being held in spaced relationship to the plate 60 by a pin (not shown) supporting it at the center thereof.

A plurality of wide cut-outs or notches 68 are formed in both plates equidistantly about the circumference of the plates. The upper plate 62 is adjustably rotated, to a limited degree, about its central axis by a bar 70 which is fixedly attached to an edge of the plate 62 and extends outwardly through the opening or slot 72 made in the side wall of the housing 14. The lateral boundary of the slot 72 serves as the means to limit movement of the bar 70, and thereby of the plate 62 within the housing 14. A handle 74, attached to the exterior end of the bar 70, allows manual manipulation of the plate 62 in relationship to a stationary plate 60. When rotated to a certain degree, the plates 62 solid portions cover the notches 68 of the plate 60, so as to form a solid heat distribution means on which a cooking pot 80 or other cooking utensil can be positioned. By gradually moving the handle 74 in relationship to the slot 72, the notches 68 can be exposed, allowing an open flame to reach the bottom of the pot 80, when required, so as to facilitate boiling or other cooking process.

A boiling pan 80 or a deep-frying pan 82 can be alternatively positioned on the top plate 62, which allows boiling or frying of food well below the top edge 17 of the housing 14. In this manner, no splattering of grease or boiling water is permitted, since the vertically extending side wall of the housing 14 protects the cooking utensil well above the level of cooking.

An additional advantage of utilizing the vertically oriented housing 14 lies in the fact that the wind does not affect the flame which escapes through the burners 42, thus allowing cooking in the most adverse weather conditions.

If necessary, the cover 28 can be lifted and left open to supervise and observe cooking of the food within the pot 80 or frying basket 82. Should heat retention be necessary, the cover 28 is moved to close the top end of the housing 14, facilitating retention of heat within the housing 14.

Attached to the side wall of the housing 14 and extending a distance inwardly therefrom are a plurality of equidistantly spaced supports or pegs 76 which extend perpendicularly to a vertical axis of the housing 14 a distance above the plates 60 and 62. The pegs 76 serve as a support to a grill plate 78 which is preferably approximates the interior diameter of the housing 14 and rests on the pegs 76. The grill plate 78 is easily removed by lifting it away from the housing 14 through the open top, when not in use.

When required, the grill plate 78 is used for positioning food directly on the plate 78, while the heat distribution is regulated through the manipulation of the position of the plate 62 underneath the grill plate 78.

The portable stove 10 of the present invention is also provided with means to allow the food to be roasted on a rotating spit or shaft over the dry heat supplied by the heating elements 42.

A circular notch 86 is formed adjacent to the top edge 17 of the housing 14 to selectively receive a shaft or rotating spit 90 therein. The second end of the shaft rests in the diametrically opposite notch formed in the edge 17 of the housing 14. One end of the shaft 90 is connected to an electrical motor 94 which is carried by the frame 12 adjacent the housing 14. The rotating shaft 90 has at least one spike assembly means mounted thereon, with the spike assembly having a cylindrical sleeve 96 having an interior diameter suitable for sliding along the shaft 90.

Such sleeves may be one or two in number, as desired. Each sleeve 96 carries fixedly attached thereto at least one spike 98 which has a first portion attached to the sleeve 96 and a second portion integrally attached to the first portion and extending perpendicularly to the first portion. When mounted on the shaft 90, the second portion extends in a substantially parallel relationship to the shaft 90. A tightening screw 97 allows secure engagement of the sleeve 96 with the shaft 90 when food is pierced and supported by the spikes 98. When not in use, the shaft 90 is simply lifted and removed from its resting position over the top edge 17 of the housing 14 and can be transported separately or alongside the housing 14 which rests on the platform 12. Electric Motor 94 is entirely mounted outside of the housing 14, so as not to interfere with the cooking process and not to be exposed to the heat generated within the housing 14.

The housing 14 can be also used for baking, by positioning a baking pan on the plate 62 and covering the notches 68 to allow even heat distribution throughout the bottom of the baking pan.

As was outlined above, the flames and the heating elements 42 are well protected from wind, while the cover 28 protects from rain, etc. In this manner, no unnecessary loss of heat is allowed, and the heating elements are not exposed to extremes of temperature differences in the interior of the heating elements or burners and the exterior thereof. This extends the life of the heating elements 42 and makes cooking in the portable stove 10 of the present invention more effective.

Many changes and modifications can be made within the design of the present invention without departing from the spirit thereof.

I therefore pray that my rights to the present invention be limited only by the scope of the appended claims.

I claim:

1. A portable stove, comprising:
   a platform;
   a vertically oriented housing having an open bottom mounted on the platform;
   a heating means positioned adjacent the bottom of the housing and connected to a fuel source outside of the housing;
   a adjustable support means for supporting cooking utensils, and for adjusting the exposure of a cooking utensil to said heating means, positioned above the heating elements in the housing; and
   a cover means pivotally attached to a top portion of the housing.

2. The device of claim 1, wherein said platform is provided with wheels to facilitate transportation of the portable stove.

3. The device of claim 2, wherein said platform comprises a horizontal portion on which the housing is supported and a vertical portion having a handle means for engaging and moving the platform.

4. The device of claim 3, wherein the platform further comprises a frame means for supporting the fuel source adjacent the housing.

5. The device of claim 1, wherein a debris collecting plate means is positioned under the open bottom of the housing.

6. The device of claim 5, further comprising means for delivering fuel to the heating elements extending above the debris collecting plate means from the fuel source.

7. The device of claim 1, wherein said means for supporting cooking utensils comprise a first and second vertically spaced apart parallel plates having a plurality of equidistantly spaced notches therein, the first plate being adapted for a limited lateral rotation about a central axis thereof, whereby notches of the second plate are superimposed by a solid surface of the first plate, so as to allow even heat distribution within the housing.

8. The device of claim 7, further comprising means for transmitting the limited rotation to the first plate attached at one of its ends to the first plate and extending to the outside of the housing through a co-aligned opening formed in a side wall of the housing, so as to allow manipulation of the first plate position from the exterior of the housing.

9. The device of claim 1, further comprising a secondary means for supporting cooking utensils fixedly attached to a side wall of the housing and extending a distance inwardly in the housing.

10. The device of claim 1, further comprising a detachably securable rotating shaft means for supporting food being cooked adjacent a top portion of the housing, the shaft means being connected to a rotation transmitting means mounted outside of the housing.

11. The device of claim 10, wherein said shaft means is provided with at least one spike means detachably mounted thereon.

12. The apparatus of claim 11, wherein the spike means comprises a sleeve having a central opening sized for slidable positioning on the shaft means, at least one spike having a first part fixedly attached to the sleeve and a second part extending in substantially perpendicular relationship to the first part, and a tightening screw for securing the sleeve on the shaft means.

13. The device of claim 10, wherein said rotation transmitting means comprise an electric motor supplying rotational force to the shaft means through a gear reduction assembly.

14. The apparatus of claim 9, further comprising a grill plate adapted for removable mounting on the secondary support means.

15. The apparatus of claim 1, wherein said cover means is provided with a ventilation means allowing escape of gas to the exterior of the housing.

16. A portable stove, comprising:
   a substantially horizontal elongated platform;
   a vertically oriented housing having an open bottom mounted adjacent one end of the platform;
   a handle means extending vertically from the platform adjacent an opposite end of the platform;
   a debris collecting plate positioned under the open bottom of the platform;
   a heating means supported adjacent a lower portion of the platform and connected by a fuel transmitting conduit to a fuel source outside of the housing;
   a first means for supporting cooking utensils positioned above the heating means inside the housing, said first supporting means comprising a first and a second vertically spaced plates mounted in parallel relationship to each other, each of the plates being provided with a plurality of equidistantly spaced notches, the first plate being laterally rotational, to a limited degree;
   means for transmitting rotational movement to the first plate comprising an elongated bar fixedly attached at one of its ends to the first plate and extending outwardly through a side wall of the housing to an exterior of the housing, a second end of the bar being provided with a handle;
   a second means for supporting cooking utensils mounted above the first supporting means and comprising a plurality of spaced-apart pegs extending from interior side wall of the housing a distance towards a center of the housing in vertically spaced relationship from the first supporting means;
   a detachably selectively positionable rotating shaft adapted for positioning adjacent a top edge of the housing and connected to a rotation transmitting power source through a gear reduction assembly positioned outside of the housing;
   a cover means pivotally attached adjacent a top edge of the housing for selectively covering the top portion of the housing in heat retaining relationship.

17. The device of claim 16, wherein the housing has a cylindrically shaped body.

18. The apparatus of claim 17, wherein said rotation transmitting means comprise an electric motor supplying rotational force to the shaft means.

19. The apparatus of claim 18, further comprising a grill plate adapted for removable mounting on the secondary support means.

* * * * *